(12) United States Patent
Forman et al.

(10) Patent No.: US 6,986,920 B2
(45) Date of Patent: *Jan. 17, 2006

(54) COMPOSITE WEB FOR MAKING GUSSETED PACKAGES

(75) Inventors: Harold M. Forman, Pennsburg, PA (US); Jeffrey F. Derosier, Clear Lake, WI (US)

(73) Assignee: Sealstrip Corporation, Boyertown, PA (US)

( * ) Notice: Subject to any disclaimer, the term of this patent is extended or adjusted under 35 U.S.C. 154(b) by 269 days.

This patent is subject to a terminal disclaimer.

(21) Appl. No.: 10/191,615

(22) Filed: Jul. 10, 2002

(65) Prior Publication Data

US 2002/0177380 A1 Nov. 28, 2002

Related U.S. Application Data

(60) Continuation-in-part of application No. 09/693,963, filed on Oct. 23, 2000, now Pat. No. 6,371,644, and a division of application No. 09/850,085, filed on May 8, 2001, now Pat. No. 6,572,267.

(51) Int. Cl.
*B32B 1/08* (2006.01)

(52) U.S. Cl. .................. 428/34.1; 428/34.3; 428/34.6; 428/35.1; 383/63; 383/64; 383/65; 383/120

(58) Field of Classification Search ................. 383/63, 383/64, 65, 68, 120, 210.1; 428/34.1, 34.3, 428/34.6, 35.1
See application file for complete search history.

(56) References Cited

U.S. PATENT DOCUMENTS 5,944,425 A * 8/1999 Forman ..................... 383/61.2
6,132,089 A * 10/2000 Galomb et al. ............... 383/63

* cited by examiner

*Primary Examiner*—Patrick Joseph Ryan
*Assistant Examiner*—Jane Rhee
(74) *Attorney, Agent, or Firm*—Walter B. Udell

(57) ABSTRACT

A composite web of packaging material for making gusseted packages having openable and reclosable interlocking seals, the seals having male and female portions, snap detents, and formed transversely to the direction of material flow. The packaging material is provided at package length intervals with thermoformable strips secured thereto transversely to the running length of the packaging material, and is fed to a modified standard vertical form, fill and seal packaging machine with gussets forming tooling where the packaging material is formed into a bag with the thermoformable strips inside at the upper end of the bag, product deposited into the bag, the bag sealed, the reclosable interlocking seal formed, and the bag severed from the next bag being formed. The reclosable seal provides auditory and tactile indications of seal closing. Some packages are formed with the thermoformable strips in the gusset, and some are formed with the gusset free of strip material.

10 Claims, 16 Drawing Sheets

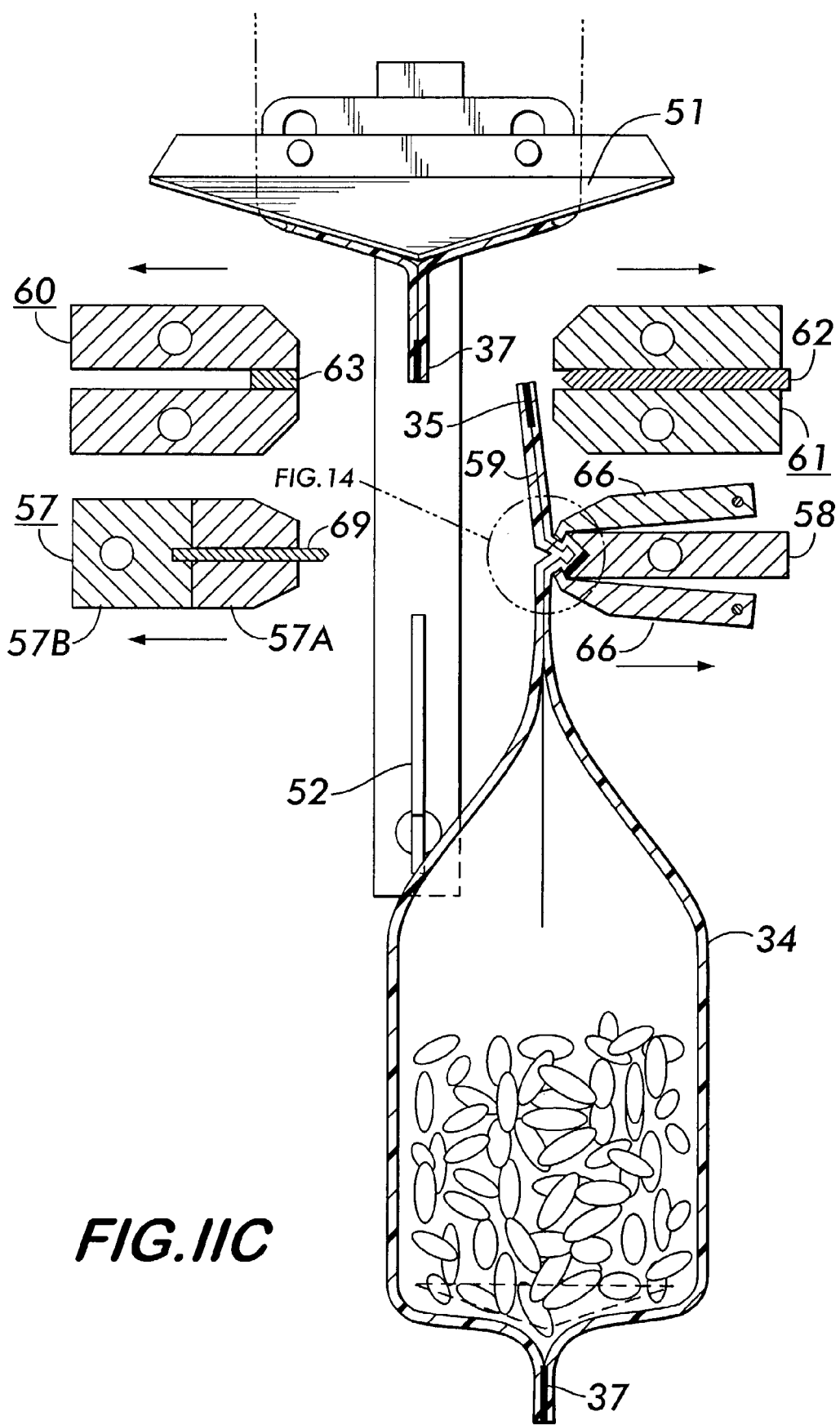
FIG.IIC

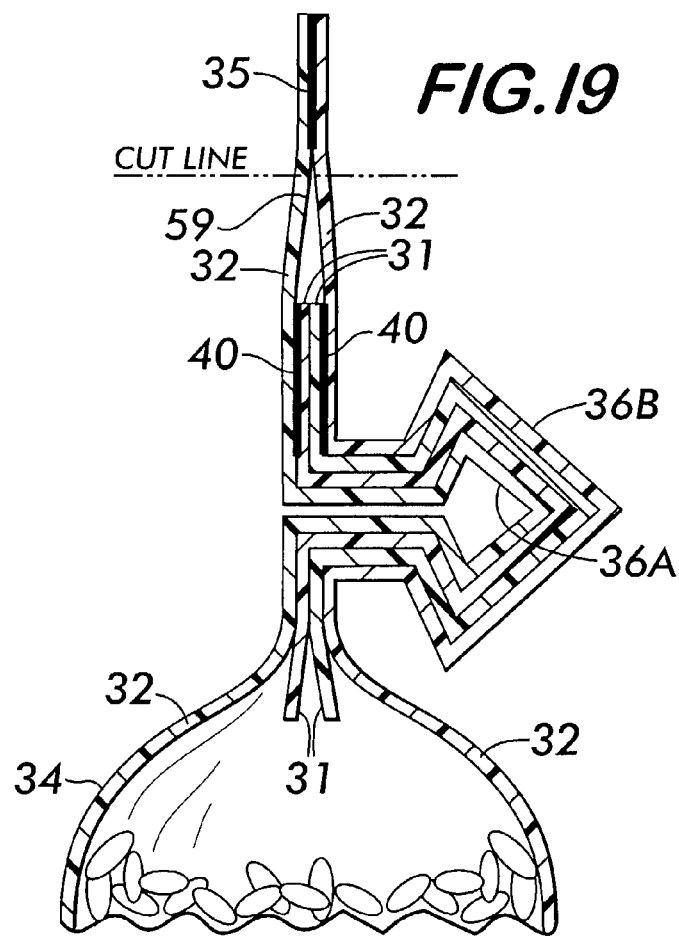
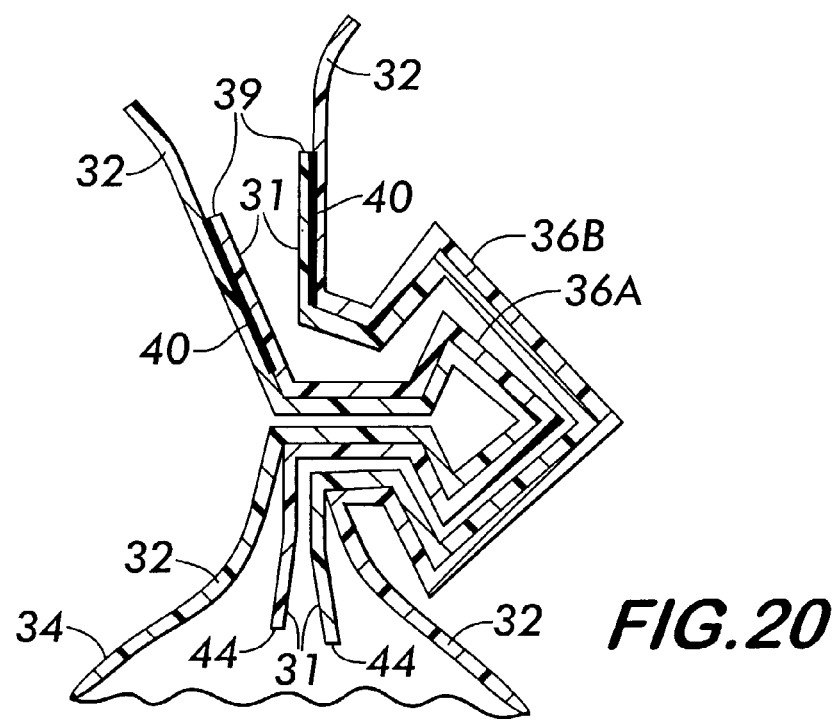

COMPOSITE WEB FOR MAKING GUSSETED PACKAGES

This application is a continuation in part of application Ser. No. 09/693,963 filed on Oct. 23, 2000 now U.S. Pat. No. 6,371,644 and a division of application Ser. No. 09/850,085 filed May 8, 2001 now U.S. Pat. No. 6,572,267.

This invention relates generally to packaging systems, and more particularly to flexible gusseted packages having an openable and reclosable interlocking seal provided with snap detents spaced along a major part of the length of the seal, the reclosable interlocking seal having male and female parts with the detents being formed in the female part and extending into the male part. The novel seal and snap detents structure provides tactile and auditory snap indications of the state of the seal during opening and closing of the package. Also disclosed are methods and apparatus for making such packages and seals from a continuous web of flexible film, the seals being formed during package formation at line speed.

BACKGROUND OF THE INVENTION

The advantages of gusseted packages for the storage of some kinds of substances is well known, and particularly where a wide mouth package or pour spout is desired. They also provide superior case packing and display shelf utilization as compared to stand-up pouches which may have zipper closures. The known art directed toward gusseted packages with some form of snap closure is Galomb U.S. Pat. No. 6,082,897. Galomb discloses a bulky two element pre-formed semi-rigid snap structure comprising a male part and a female part both affixed to the outside of the package by tacking or adhesive, each of which parts is secured to the package material along only one of the part edges so that the package material can move longitudinally relatively to the female part and can be stuffed into it by the male part during package closure. The snap parts are sufficiently bulky and rigid that they are not capable of being run over the forming collar of a vertical form fill apparatus and must be separately inventoried and affixed to the package after it has been formed. No apparatus for or method of making the package is disclosed by Galomb.

SUMMARY OF THE INVENTION

The gusseted package and system according to the present invention utilize composite packaging film structures comprising the packaging film with several different configurations of uni-planar strips of formable plastic laminated to the film at package length intervals from which several different gusseted packages are respectively formed, some packages having the formable plastic strip within the gussets and some packages which utilize relatively thick packaging film having the gussets formed without such plastic strip. The composite packaging film structures may be preformed and stored as roll stock material, which does not appear to be practical with the Galomb structure, or may be concurrently made with package formation by a Sig Pack, Inc. Easy Snap™ Laminator mounted atop or adjacent to the packaging apparatus to form one of the shown and to be described specific novel composite packaging film structures, which composite film is then fed into the packaging apparatus with the uni-planar plastic strips disposed on the inside of the package and incorporated into the novel reclosable seal formed in the film and strip composite. The laminator functions with both horizontal and vertical form/fill/seal wrapping machines and with overwrap packagers, and laminates various plastic strip materials to diverse heat seal packaging films to selectively form several related types of gusseted packages.

As disclosed in co-pending application Ser. No. 09/693,963 now U.S. Pat. No. 6,371,644, the packaging films could be for example, polypropylene, polyethylene, polystyrene, polyvinylchloride, thermoplastic heat seal coated non-plastic films, and various film laminations of two to four layers, while the plastic strip could be formed of one to three layers. In some applications the strip could be a single thickness of polyvinylchloride (PVC) heat sealed to a PVC film at a temperature of about 230° F. for ½ to ¾ seconds, while in other applications the strip could be of two layers such as PVC plus a sealing layer, or three layers such as a center layer coated on opposite sides respectively with a sealing layer and a release layer to prevent the strip from self adhering during formation of the reclosable interlock seal. A commonly used packaging film is a four layer film consisting of two layers of polypropylene separated by a layer of low density polyethylene and having a heat seal layer of low density polyethylene coated on one face.

The invention is shown and described in conjunction with a modified vertical form, fill and seal packaging machine having a novel package sealing press which latter also forms the novel resealable closure, the packaging machine being for example a Sig Pack, Inc. Eagle Infinity, Model 1524 fitted with standard gusset tooling, Gusseted packages made according to the invention incorporating the novel reclosable seal also address consumer complaints relating to prior art zipper seals by providing clear auditory and tactile indications of the closing of the reclosable seal by incorporation of snap detents, so that the consumer is assured that the package has been resealed even in the absence of visual package inspection.

Accordingly, it is a primary object of the invention to provide novel packaging film structure for making gusseted packages with openable and reclosable interlocking seals.

Another object of the invention is to provide novel composite packaging film structures comprising packaging film with uni-planar strips of formable plastic laminated to the film at package length intervals.

An additional object of the invention is to provide novel packaging film structure for making gusseted packages having a novel openable and reclosable interlocking seal as aforesaid in which the bulk of the seal structure is provided by an added layer of strip material secured in a specific way to the packaging film at package length intervals.

A further object of the invention is to provide novel packaging film structure for making gusseted packages having novel openable and reclosable interlocking seals as aforesaid in which the ends of the strip material are positioned in abutment at substantially the center of one face of the package to provide a hinge to assist in package opening.

Still another object of the invention is to provide novel packaging film structure for making gusseted packages having reclosable interlocking package seals having male and female parts with snap detents formed in the parts, the closure structure providing tactile and auditory snap indications of the state of the closure during opening and closing of the package.

A yet further object of the invention is to provide novel gusseted packages as aforesaid in which the reclosable interlocking seal is formed from the packaging film and a heat sealable strip heat sealed to the packaging film.

A still further object of the invention is to provide novel gusseted packages as aforesaid in which the packages may be formed from a variety of packaging films such as polypropylene, polyethelene, polystyrene, polyvinylchloride, and various film laminates.

The foregoing and other objects of the invention will be more clearly understood from a reading of the following description in conjunction with an examination of the appended drawings, wherein.

Figure 1:
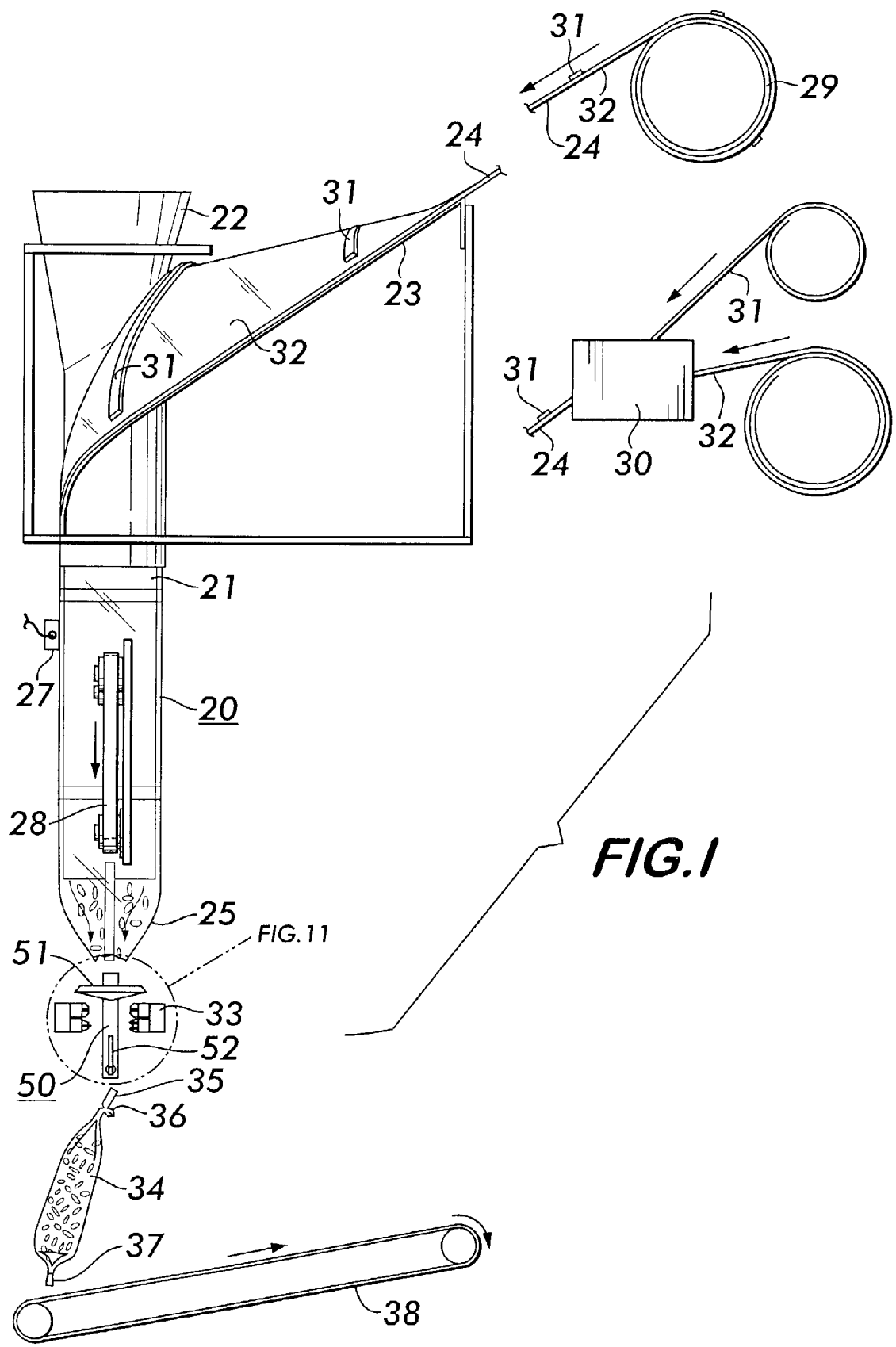
FIG. 1 is a diagrammatic side view of the apparatus according to the invention showing the method and stages of gusseted package forming, filling, sealing, and severing.
Figure 18:
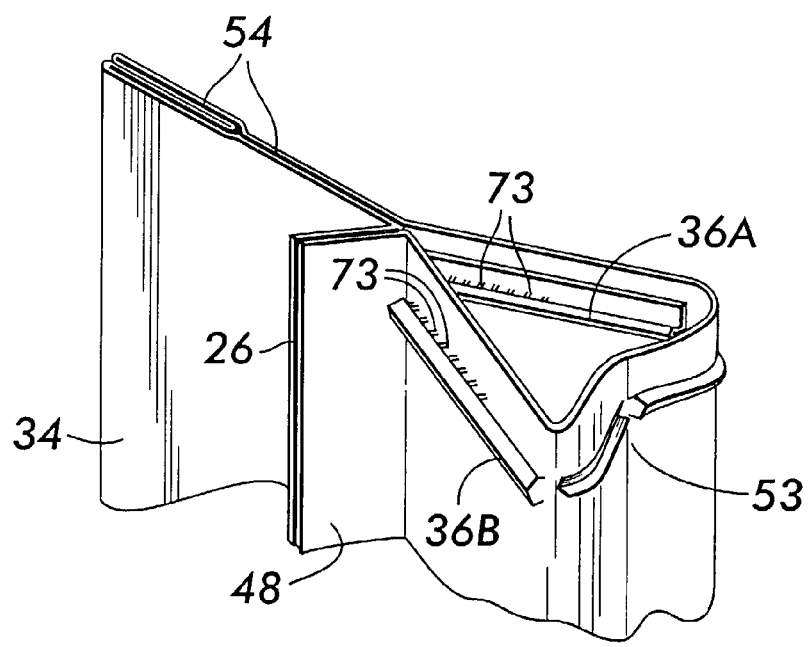
Figure 3:
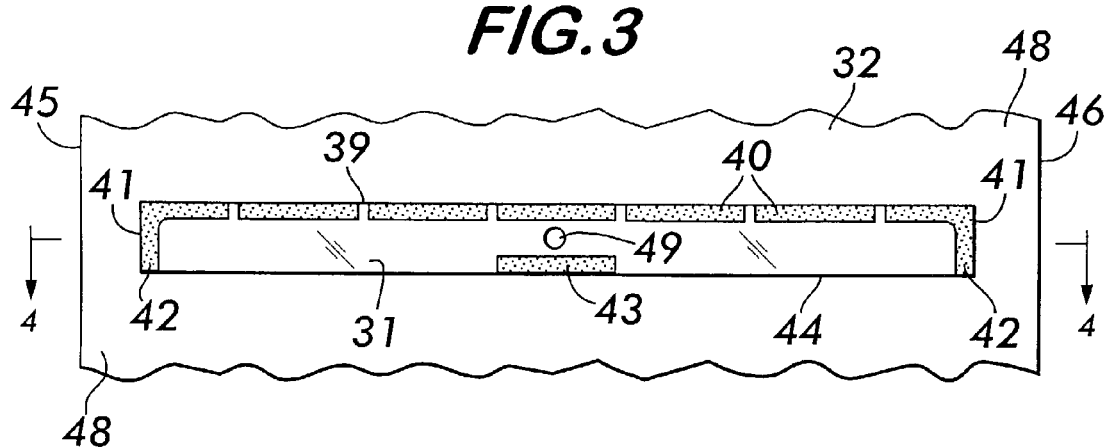
FIG. 3 is a plan view of a portion of one form of the novel composite film showing the packaging film and the placement of the attached plastic strips suitable for making a gusseted package having a fin seal longitudinal seal, and in which the gussets include a portion of the plastic strip material.
Figure 6:
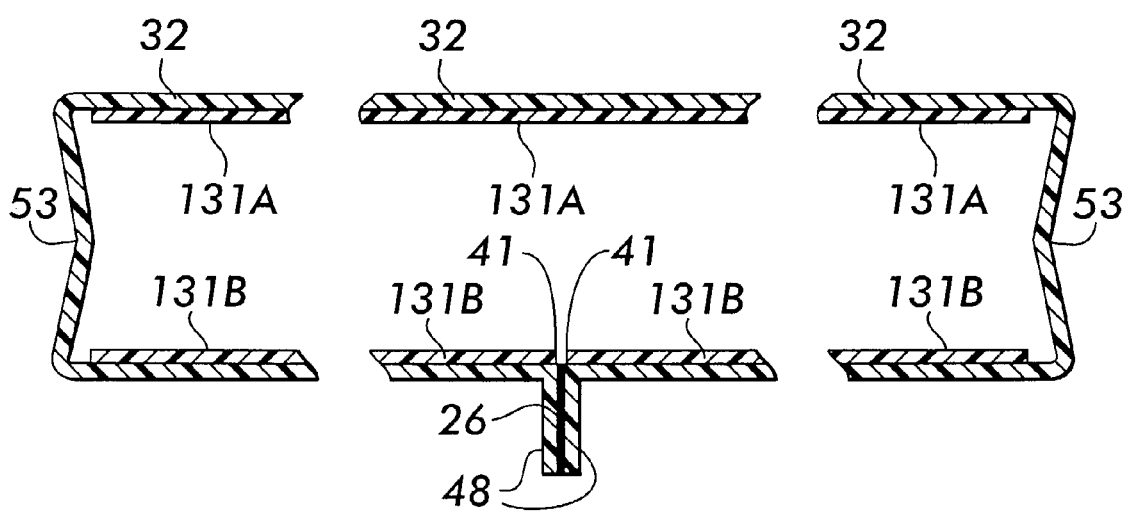
FIG. 6 is a diagrammatic cross section view through an open gusseted package formed from the film of FIG. 5.
Figure 6A:
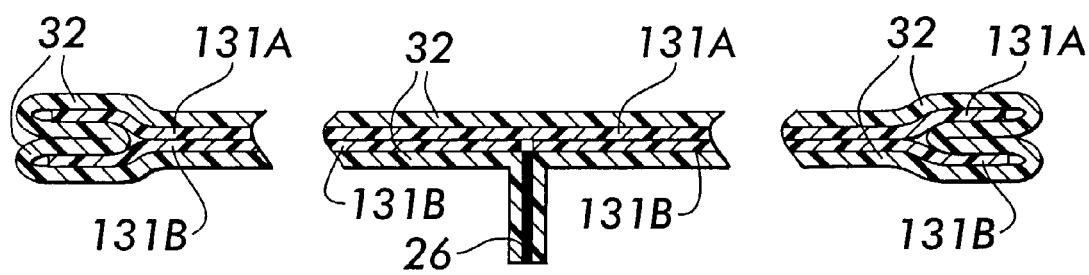
FIG. 6A is a diagrammatic cross sectional view of the package of FIG. 6 in its closed condition.
Figure 7:
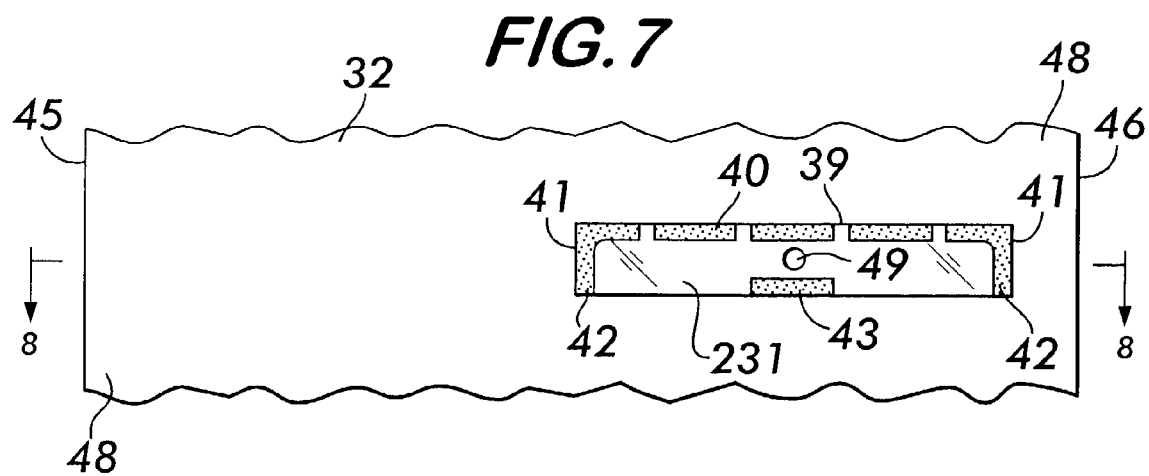
FIG. 7 is a plan view of a portion of another form of the novel composite film showing the packaging film and the placement of an attached plastic strip suitable for making a gusseted package having a fin seal longitudinal seal, a half package transversely extending fixed seal, and a half package transversely extending gusseted reclosable seal.
Figure 8:
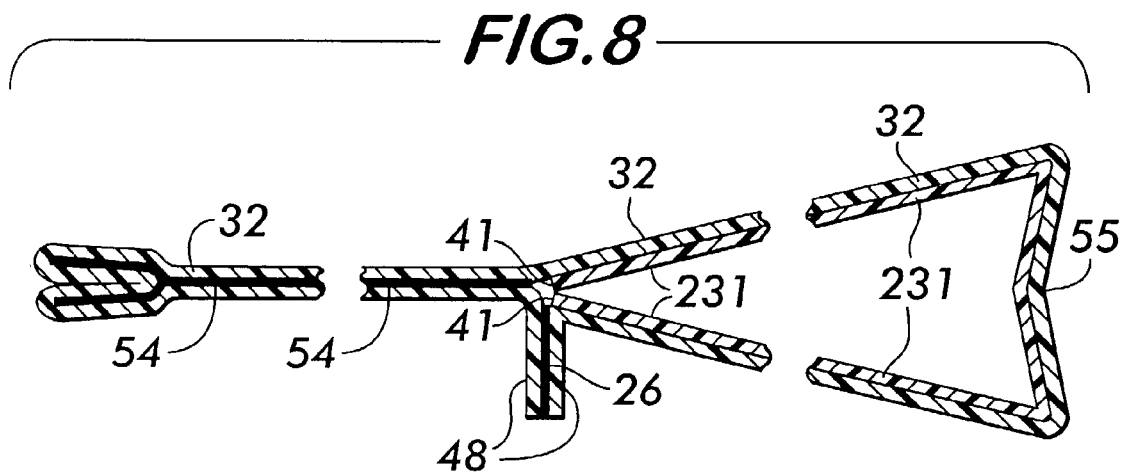
FIG. 8 is a diagrammatic cross section view through an open reclosable seal gusseted package formed from the film of FIG. 7, the package having a fin seal longitudinal seal, a half package transversely extending fixed seal, and a half package transversely extending gusseted reclosable seal in which the gusset include a portion of the plastic strip material.
Figure 8A:
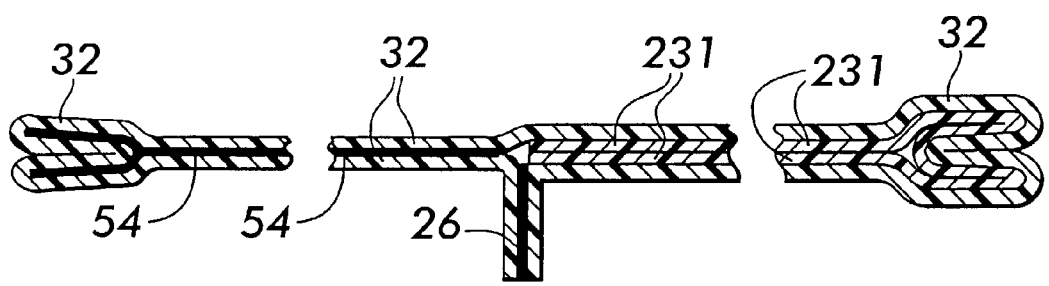
FIG. 8A is a diagrammatic cross sectional view of the package of FIG. 8 in its closed condition.
Figure 9:
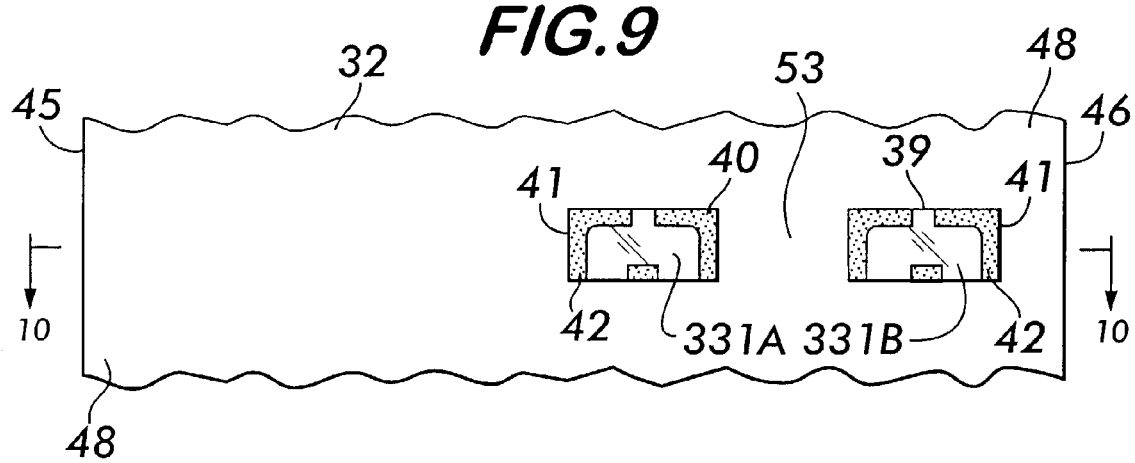
Figure 10:
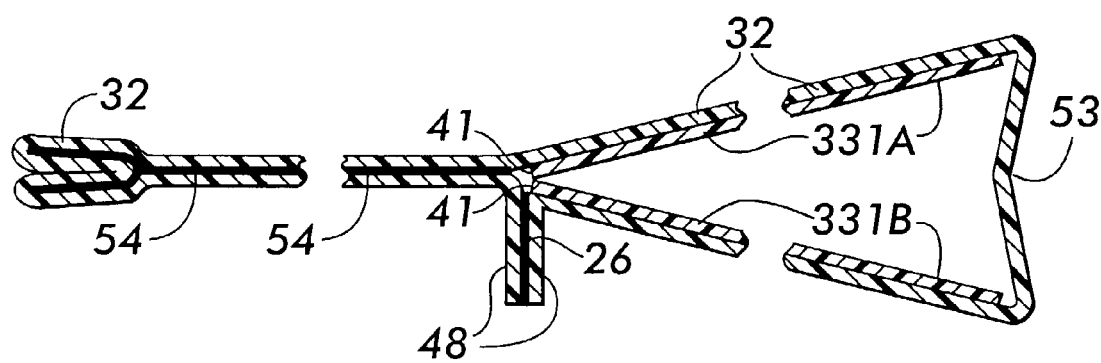
Figure 10A:
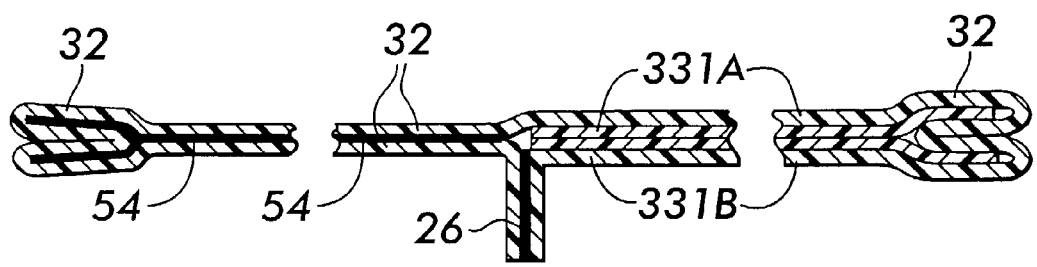
Figure 11:
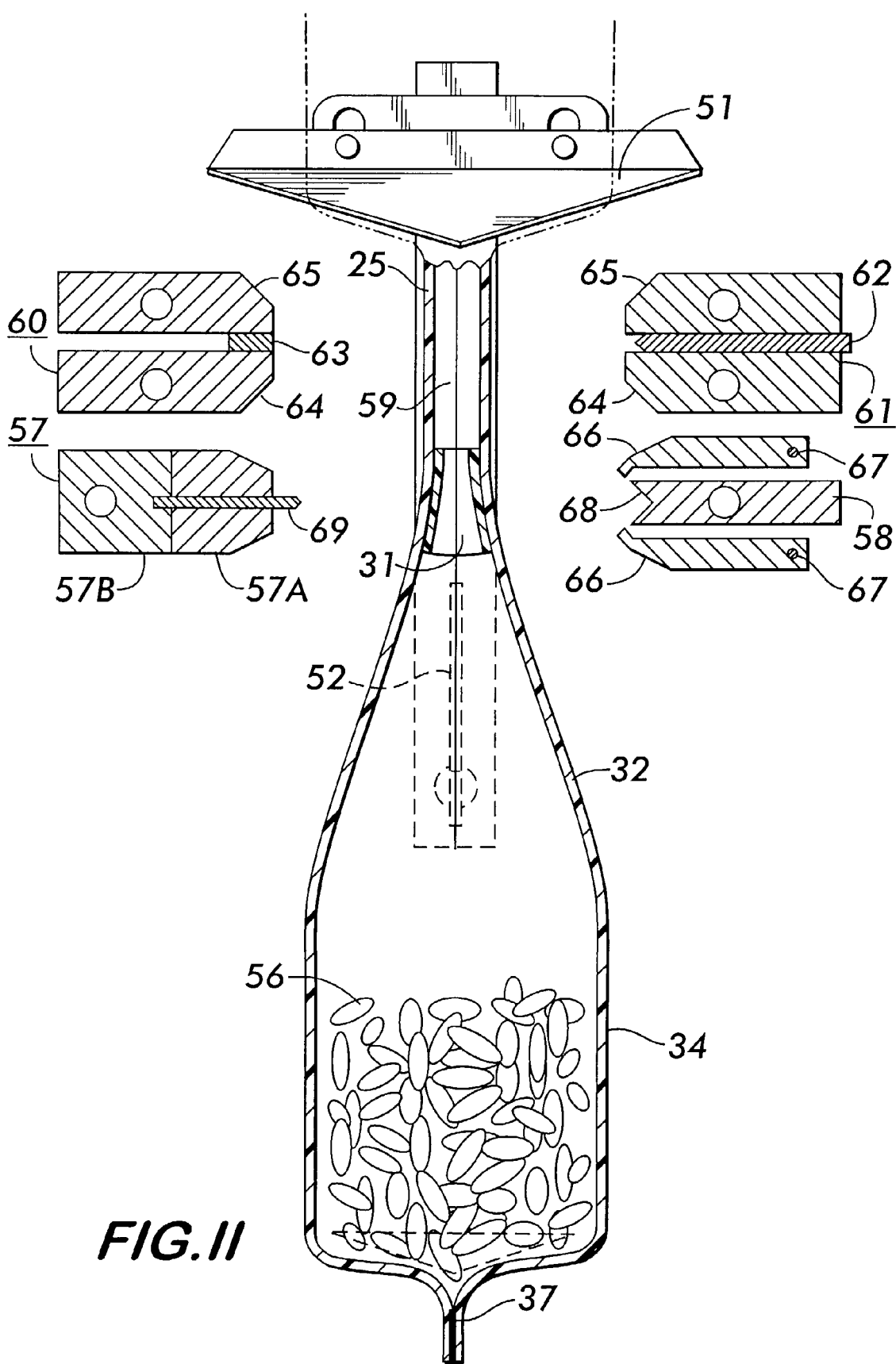
Figure 11A:
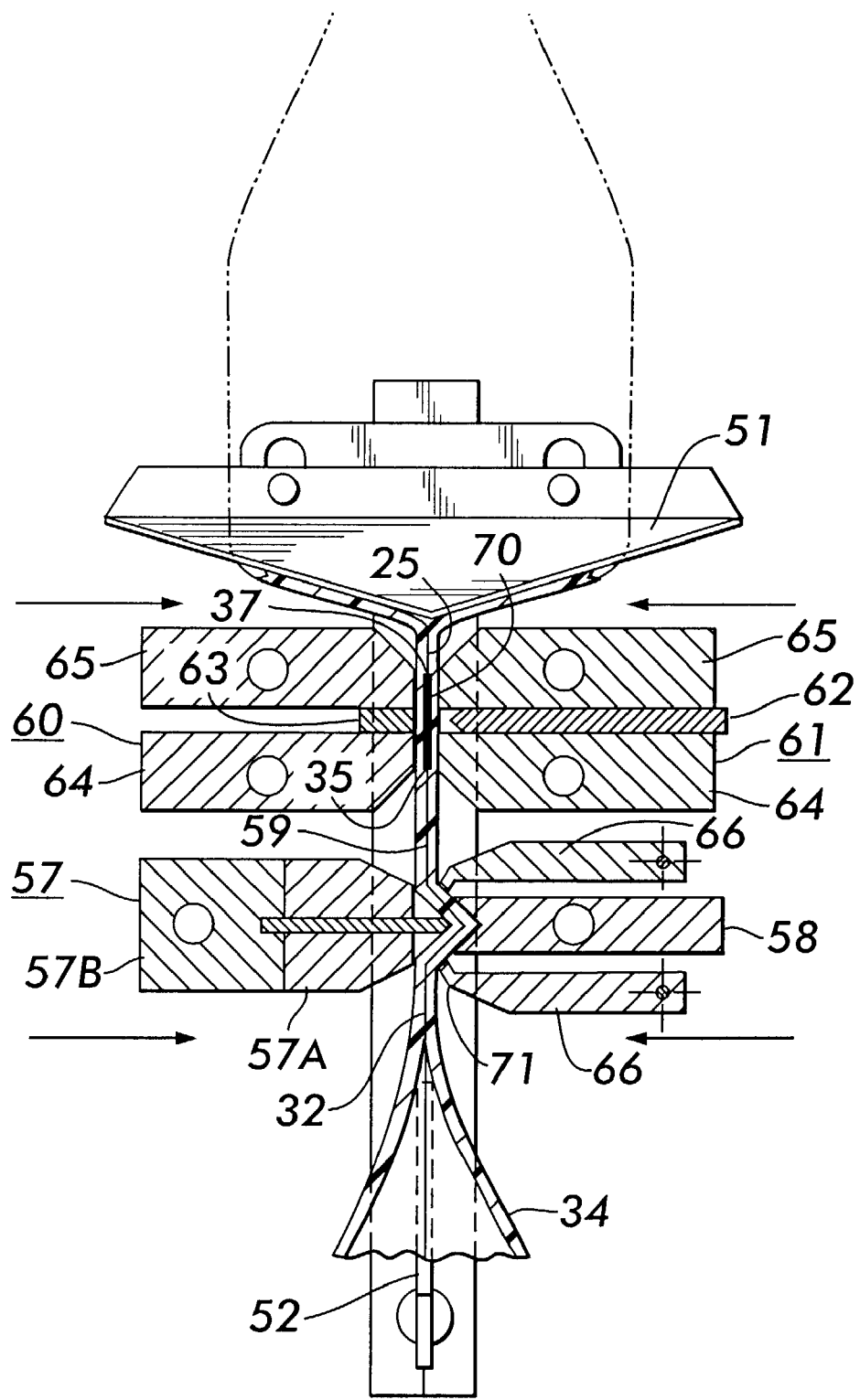
Figure 11B:
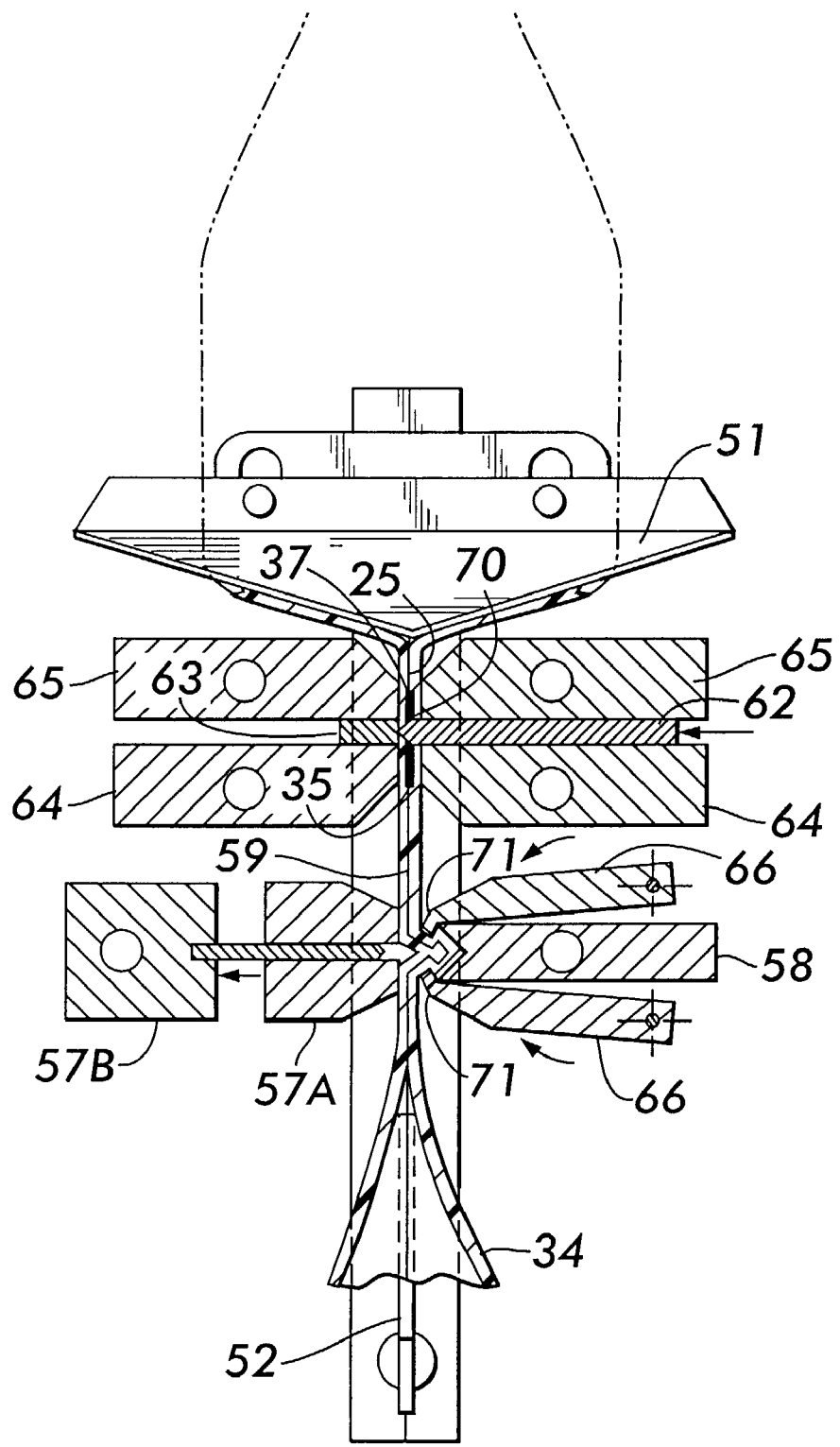
Figure 12:
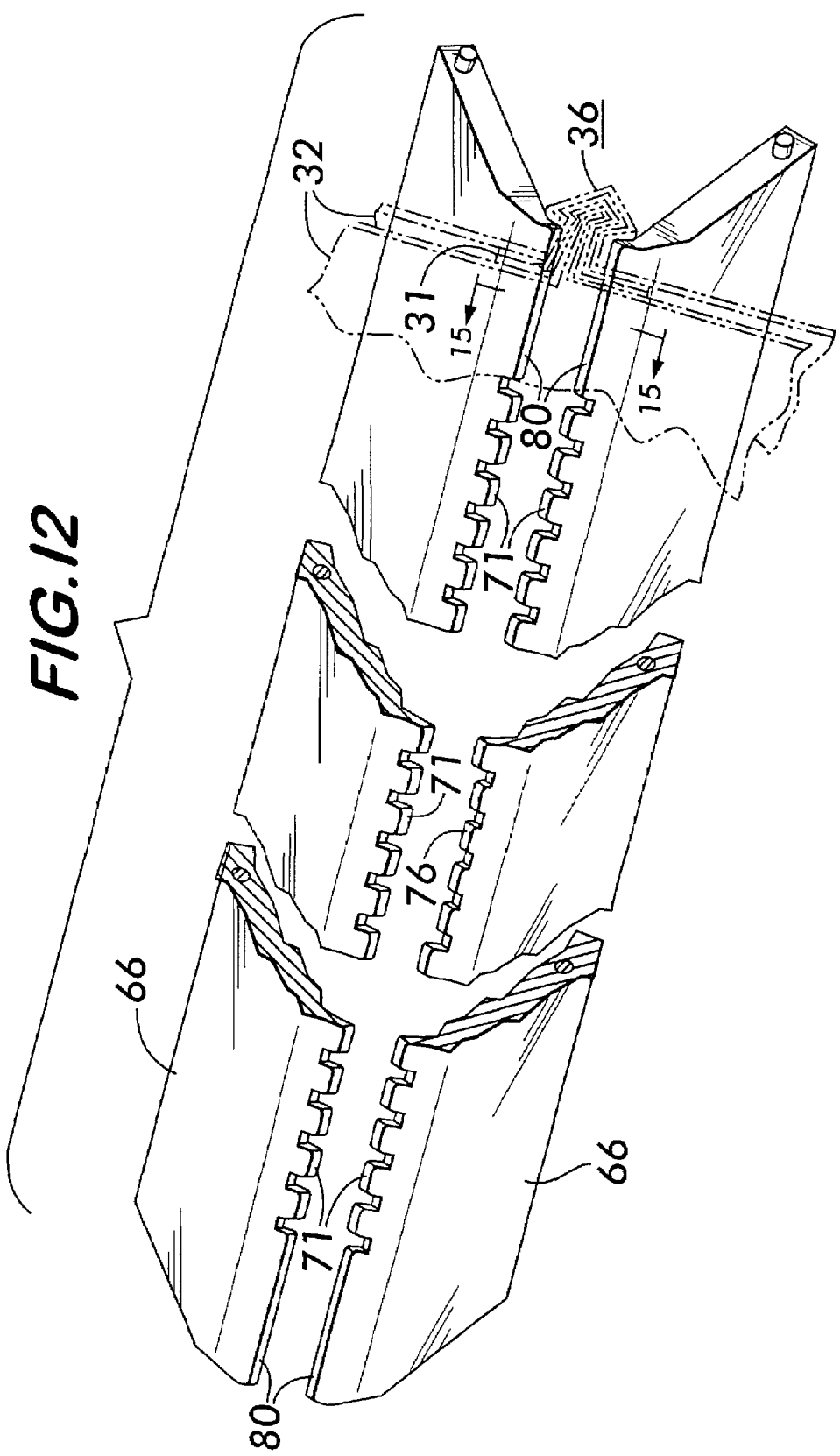
Figure 13:
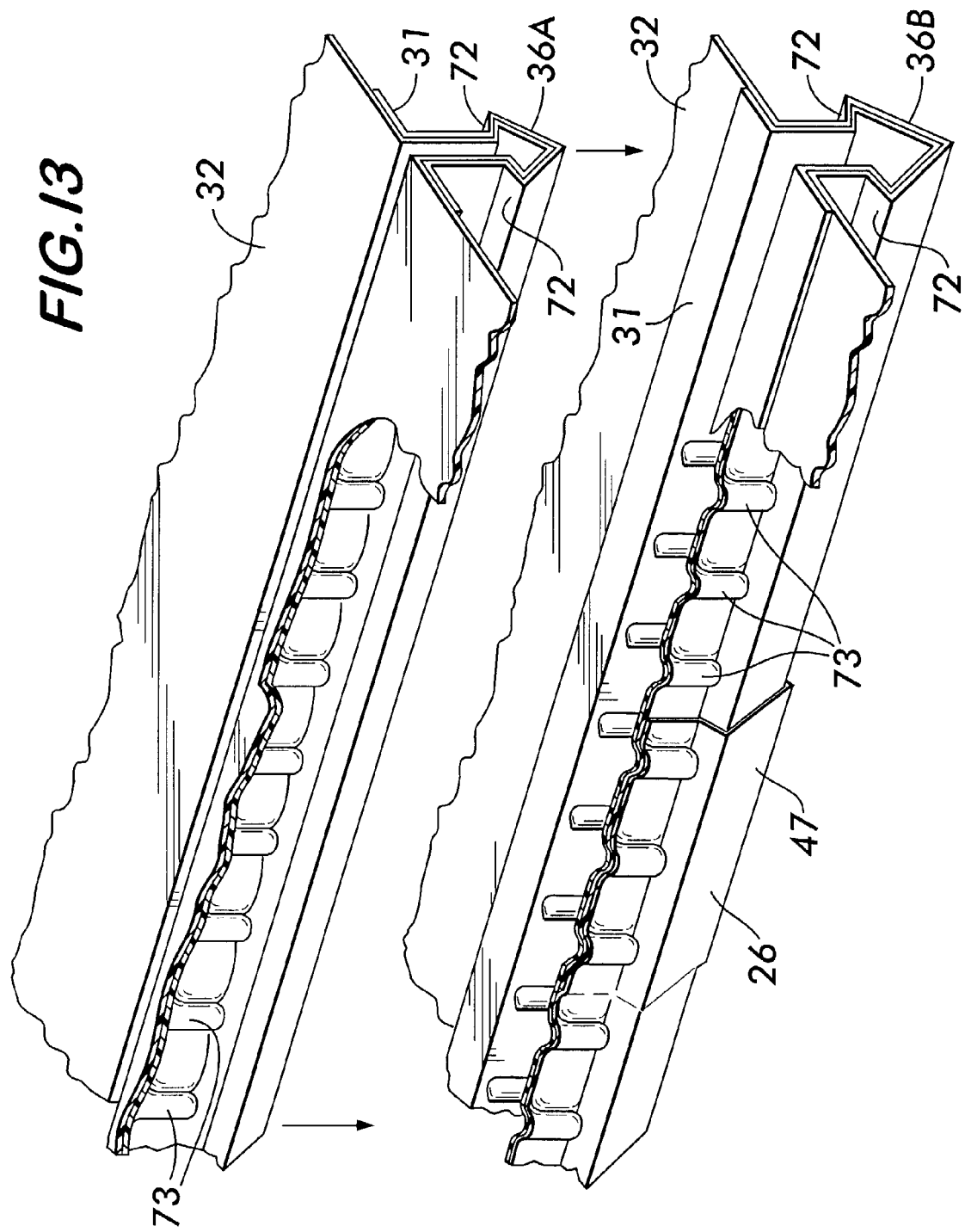
Figure 14:
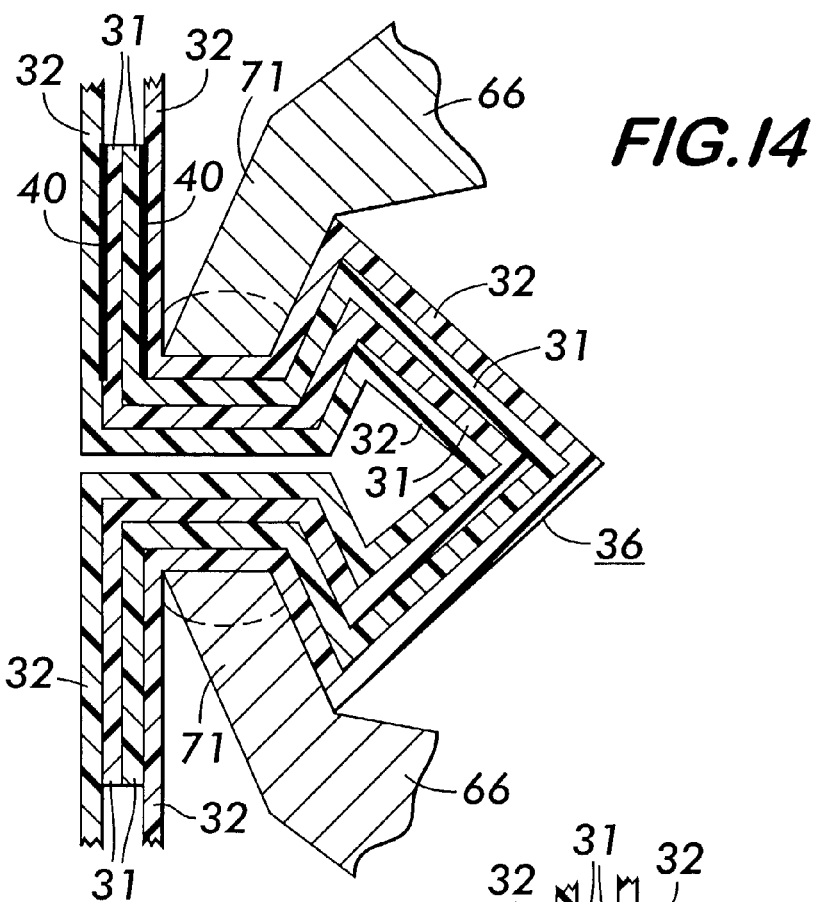
Figure 15:
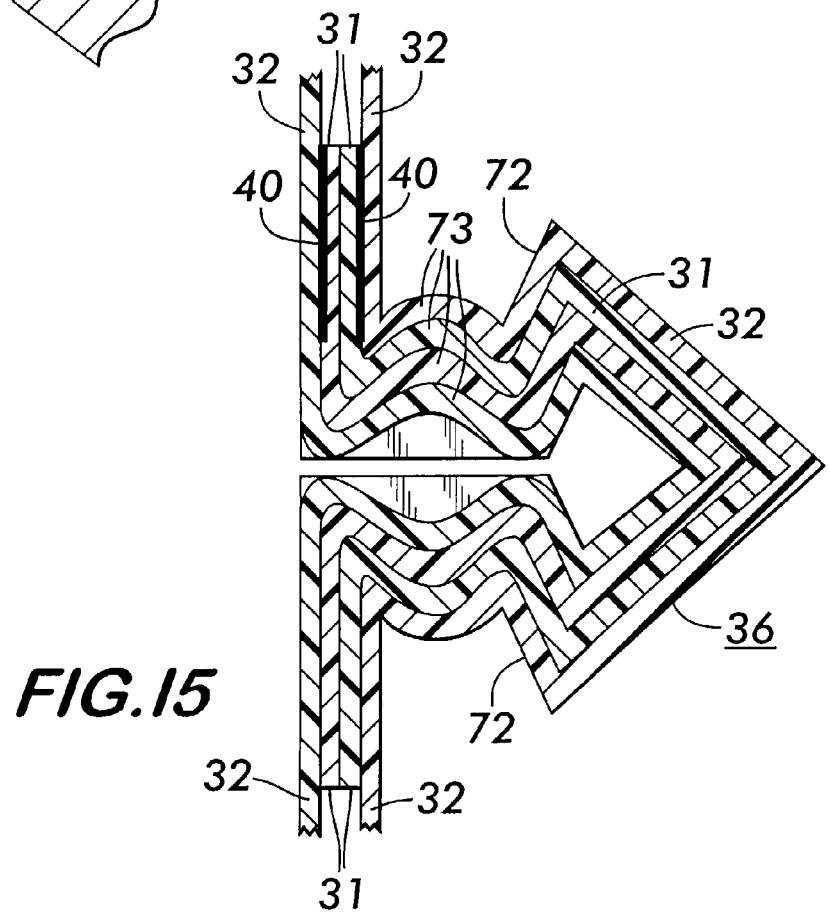
Figure 16:
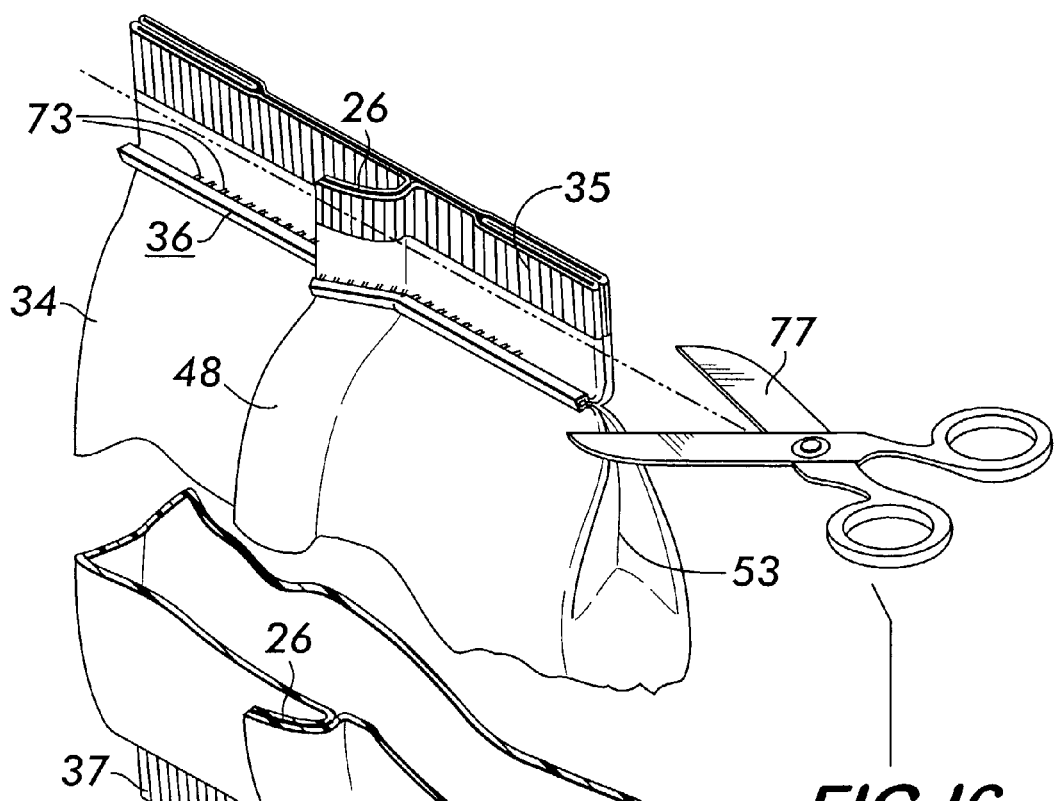
Figure 17:
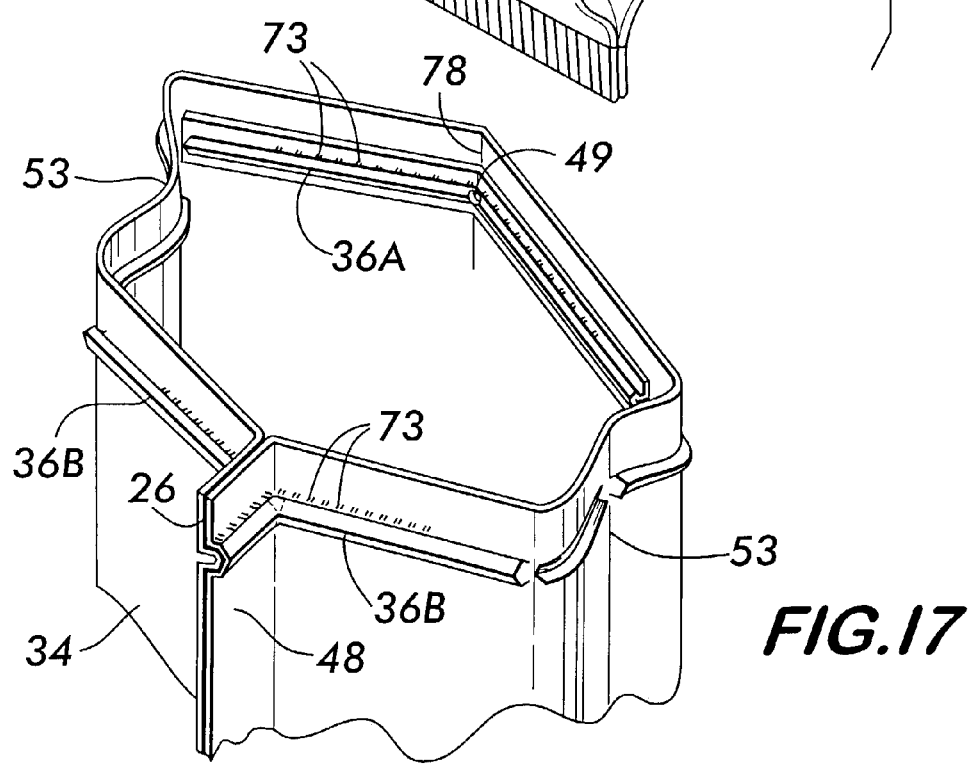

FIG. 9 is a plan view of a portion of yet another form of novel composite film showing the packaging film and the placement of the attached plastic strips suitable for making a gusseted package having a fin seal longitudinal seal, a half package transversely extending fixed seal, and a half package transversely extending gusseted reclosable seal, and in which the gussets are free of any plastic strip material;

FIG. 10 is a diagrammatic cross section view through an open reclosable seal gusseted package formed from the film of FIG. 9;

FIG. 10A is a diagrammatic cross sectional view of the package of FIG. 10 in its closed condition;

FIG. 11 is an enlarged expanded vertical cross sectional view showing the detailed structure of the gussetting tooling and seals forming and package severing apparatus shown in the phantom circle 11 on FIG. 1;

FIGS. 11A through 11C show successive steps in the ends sealing, reclosable seal forming, and package severing process;

FIG. 12 is an isometric view showing the forming dies which form the snap detents in the reclosable interlocking seal, with a part of the reclosable seal shown in phantom outline;

FIG. 13 is an enlarged fragmentary isometric view of the inner and outer parts of the reclosable seal in separated position, showing the snap detents in the sidewalls of the seal adjacent to the arrowhead interlock;

FIG. 14 is an enlarged cross section through the reclosable seal shown in the phantom circle on FIG. 11C showing the placement of the forming dies of FIG. 12 and between the snap detents;

FIG. 15 is an enlarged cross section through the reclosable seal and the snap detents which are formed between the teeth of the forming dies, as would be seen when viewed along line 15—15 on FIG. 12;

FIG. 16 is an isometric view of a gusseted package according to the invention of the type shown in FIG. 6 but showing a longitudinally extending overlap package seal uppermost, the package end seals, the integrally formed reclosable seal with the female portion uppermost and the seal detent snaps;

FIG. 17 shows the package of FIG. 16 with the top end seal removed and the package opened;

FIG. 18 is a showing similar to that of FIG. 17 but for the package of FIG. 10;

FIG. 19 is is an enlarged cross sectional diagrammatic showing of the upper end of a package including the novel reclosable interlocking seal according to the invention in its closed condition, and the package top heat seal spaced above the reclosable seal with an intervening length of unsecured package film; and FIG. 20 is an enlarged cross sectional diagrammatic showing of the novel reclosable interlocking seal according to the invention similar to FIG. 19 but with the reclosable seal partly pulled open from the top;

In the several figures, like elements are denoted by like reference characters, and to the extent possible the reference characters are consistent with those of co-pending application Ser. No. 09/693,963.

Figure 2:
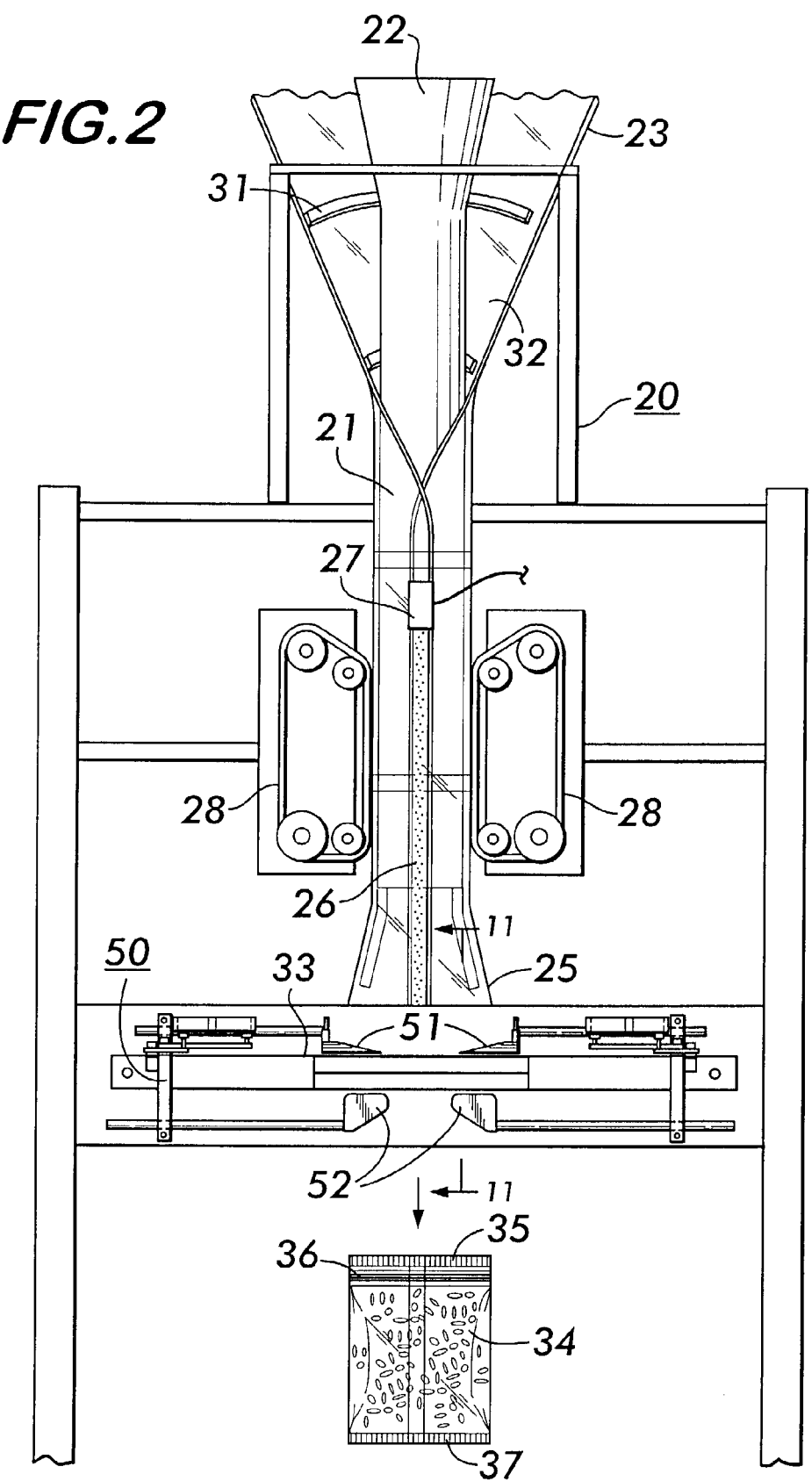
FIG. 2 is a diagrammatic front view of the apparatus seen in FIG. 1.

Considering first the side and front diagrammatic elevational views of FIGS. 1 and 2, there is seen a modified conventional vertical form-film packaging apparatus designated generally as 20 for forming gusseted packages, and which could be for example a Sig Pack, Inc. Eagle Infinity, Model 1524, comprising a vertical cylindrical fill tube 21 surmounted by a conical feed horn 22 into which the material to be packaged is deposited. Disposed adjacent to the feed horn 22 at an angle of about fifteen degrees above the horizontal and turned downward around the feed horn 22 and fill tube 21 with a slight space therebetween is a fill tube forming collar 23, the purpose of which, together with the fill tube 21, is to form a composite web of packaging material 24 being fed over the forming collar 23 into a tube having a longitudinally extending seal 26 formed by the heat seal device 27.

A pair of belt drives 28, by pulling downward on the tube 25, pull the web 24 downward off of the supply roll 29 or from the composite web forming apparatus 30 which laminates thermoformable strips 31 to the packaging material 32 to form the composite web of packaging material 24. The apparatus 30 may be a a Sig Pack, Inc. Easy Snap™ Laminator. The filled descending tube is formed into a gusseted tube 25 by the gusset tooling, designated generally at 50 and described more fully in connection with FIGS. 2 and 2A, the gusseted tube passing through the bottom press 33 where it pauses for formation of the top seal 35, the reclosable seal 36, formation of a bottom seal 37 of the next descending package, and severing of the completed package 34 from the above lying tube. The completed package 34 is carried away by the conveyor 38.

Figure 2A:
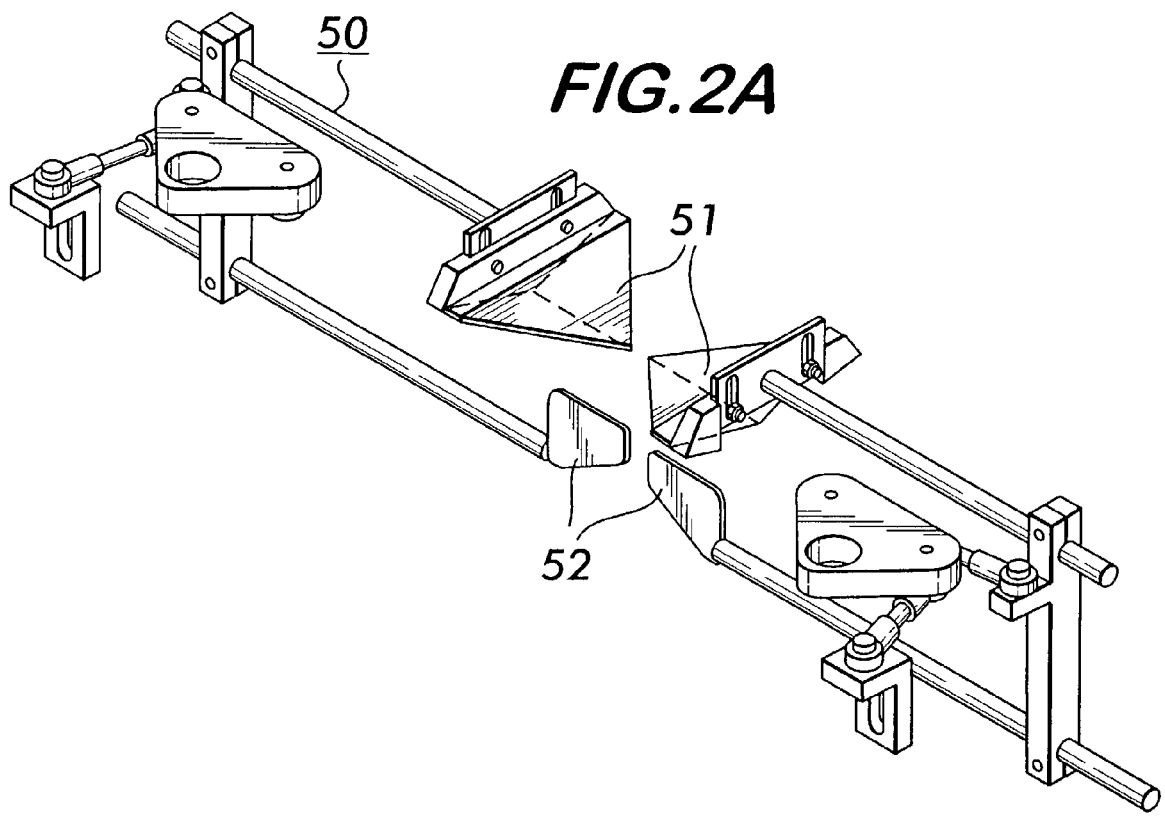
FIG. 2A is an isometric view of the gusset tooling utilized in the apparatus of FIGS. 1 and 2.

The apparatus of FIGS. 1 and 2 departs from conventional vertical form-fill apparatus in several particulars, first, by modifying the orientation of the fill tube forming collar 23 to the surface of the conical feed horn 22 by reorienting the forming collar as shown and described in co-pending application Ser. No. 09/693,963, and providing a leading edge tack 44 to the strips 31, as shown in FIGS. 3, 5, 7, and 9 to be subsequently described. The second difference is the inclusion of the subsequently to be described novel bottom press 33 which forms the novel gusseted reclosable seal, in conjunction with the gusseting tooling 50. The gusset forming tooling 50 is seen in FIGS. 1 and 2 positioned with the gusset forming plow 51 positioned above the press 33 and with the gusset maintaining tool 52 positioned below the press 33 so that the shape of the gussetted tube 25 is formed above and maintained throughout and somewhat below the vertical extent of the press 33, whereby the press acts on the gusseted form of the tube 25. Details of the gusset forming tooling 50, including the upper plow 51 and the lower maintainer 52 are best seen in the showing of FIG. 2A which also shows the reciprocating mechanism for retracting and inserting the gusset forming plow 51 and maintainer 52.

Considering now FIGS. 3, 5, 7, and 9, there are seen the packaging film material 32 and respectively a plurality of different configurations of thermoformable uni-planar strips 31, 131A and 131B, 231, and 331A and 331B, secured to the film 32 substantially continuously along the strips trailing edges 39 by heat seals 40, along the strips ends 41 as at 42, and by short tacks 43 at the center of the strips leading edges 44 to insure that the leading edge is against the packaging film as the composite web passes into the space between the feed horn 22 and forming collar 23 to prevent tearing off the strips from the film. The uni-planar strips are all secured to the film inward from the film side edges to provide the margins 48 for formation of the longitudinal fin seals 26. Various types of suitable plastic strip material are shown and described in co-pending application Ser. No. 09/693,963.

FIGS. 3, 5, 7, and 9 show the different configurations of strips on the film 32, required to form the different gusseted packages of FIGS. 4, 6, 8, and 10 respectively. Strip 31 of FIG. 3 produces the gussetted package of FIG. 4 having the strip 31 extending completely peripherally around the inside of the gusseted tube, in the sides of the package and in the gussets 55. Strips 131A and 131B of FIG. 5 form the gusseted package of FIG. 6 with both gussets free of the plastic strip material and formed only by the packaging film 32, the gussets being defined by the film regions 53 shown in FIGS. 5, 6, 9, and 10. Strip 231 of FIG. 7 forms the gusseted package of FIG. 8 having a fin seal longitudinal seal, a half package transversely extending fixed seal 54, and a half package transversely extending gusseted reclosable seal in which the gusset 55 includes a portion of the plastic strip material 231. Strips 331A and 331B of FIG. 9 form the gusseted package of FIG. 10 having a fin seal longitudinal seal, a half package transversely extending fixed seal 54' like that of 54 in FIG. 8, and a half package transversely extending gusseted reclosable seal in which the gusset is free of the plastic strip material and formed only by the packaging film 32, the gusset being defined by the film region 53 also shown in FIG. 9. The package transverse extents of the fixed seals 54 of FIGS. 8, 8A, 10, and 10A relative to the extents of the package reclosable seals has been shown as substantially equal, but other ratios can be chosen as desired.

The strips 31 and 131A are also provided with apertures 49 through the strips which in the completed packages act as a weakened region allowing a hinge fold to occur when the package is opened. Another hinge is provided in the completed packages opposite the first hinge by the substantially abutting apposed ends 41 of the strips 31, 131B, 231, and 331A and 331B as seen in FIGS. 4, 6, 8, and 10, all of which show a fin seal longitudinal package seal 26 formed by the side margins 48. An overlap longitudinal seal may be made by other vertical form-fill machines, and such is illustrated in FIG. 13.

Figure 4:
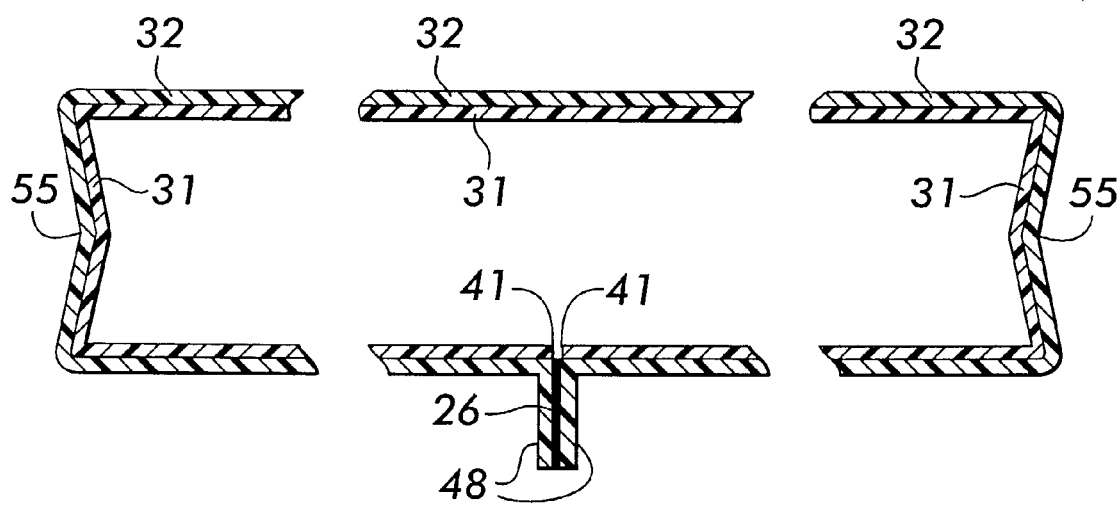
FIG. 4 is a diagrammatic cross section view through an open top gusseted package formed from the film of FIG. 3 showing the sides gussets which include a portion of the plastic strip material.
Figure 4A:
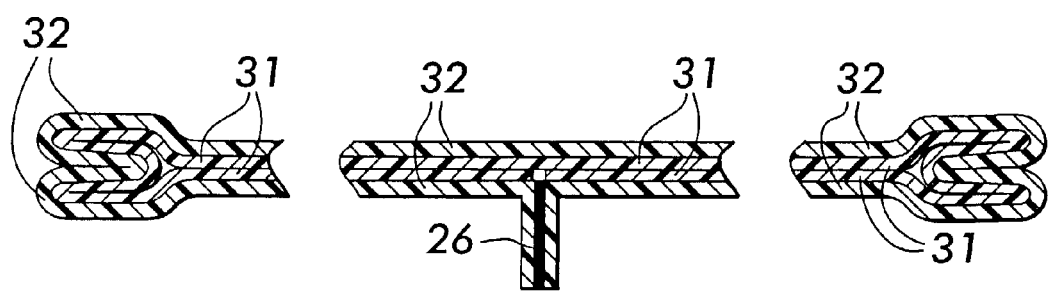
FIG. 4A is a diagrammatic cross sectional view of the package of FIG. 4 in its closed condition.
Figure 5:
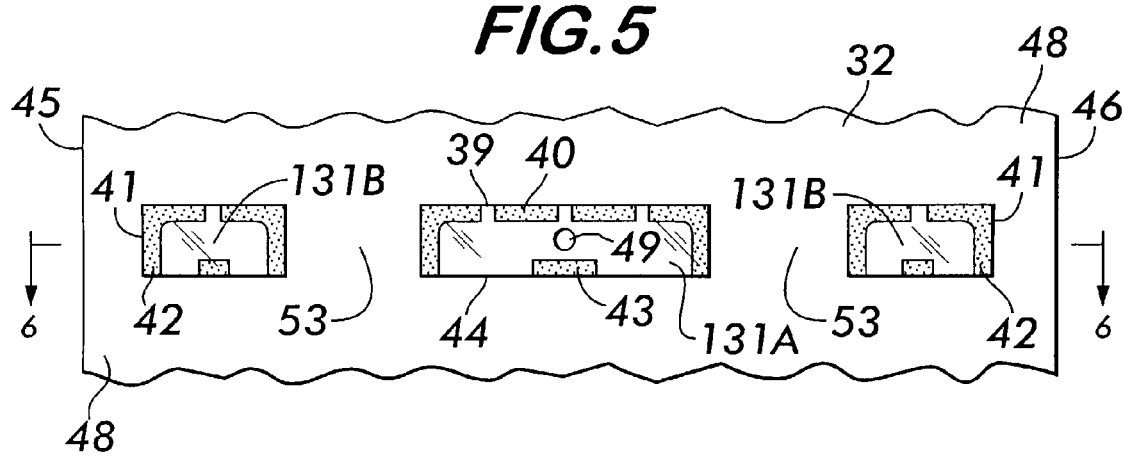
FIG. 5 is a plan view of a portion of another form of the novel composite film showing the packaging film and the placement of the attached strip suitable for making a gusseted package in which both side gussets are free of the plastic strip material and are formed only by the packaging film.

Turning now to FIGS. 11 through 11C which illustrate the formation of the package end seals and reclosable seal of the package of FIG. 4, there is seen in FIG. 11 a partly completed gusseted package 34 which has been filled with product 56 while descending, and has stopped at a position where the upper part of the package is within the bottom press 33 just prior to completion by the formation of the top seal and reclosable seal. The package 34 is stopped so that the thermoformable strip 31 is positioned between the reclosable seal forming horizontally reciprocable heated female die 58 and the two part heated male die 57, with an above-lying length 59 of the tube 25 positioned below the composite heated dies 60 and 61 and the package severing cutter 62 and anvil 63. The female die 58 is provided with a forming recess 68, and the male die is provided with a forming wedge 69 carried by the male die part 57B and shaped complementally to the female die recess 68. The composite dies 60 and 61 consist of a pair of dies 64 which form the top seal 35 of the package 34 being completed, and a pair of above-lying dies 65 which form the bottom seal 37 of the next package to descend. Disposed above and below the forming recess 68 of female die 58 are a pair of heated reclosable seal detent forming toothed dies 66 reciprocable with the female die 58 and pivotable toward one another on pivots 67.

FIG. 11A shows the reclosable seal forming heated dies 57 and 58 moved toward one another and into engagement, heat forming the package film 32 and thermoformable strip 31 into the recess of the female die 58 to form the point of the arrowhead shaped reclosable seal. For clarity, the strip 31 is not shown in FIGS. 11A through 11C, but its location is seen clearly from FIGS. 11 and 13 to 15. At the same time, the heated dies 60 and 61 heat seal the gusseted tube 25 entirely widthwise for a vertical interval 70 and define the unsecured interval 59 between the bottom of the top seal 35 and the top of the reclosable seal 36, the portion of the seal 70 heated by the dies 64 becoming the package top seal 35, and the portion of the seal 70 heated by the dies 65 becoming the bottom seal 37 of the next descending package when the seal 70 is subsequently severed widthwise by the cutter 62.

The next step is a hybrid between FIGS. 11A and 11B in which the conditions are as shown in FIG. 11A except that the detent forming dies 66 have pivoted inward and closed sufficiently to begin formation of the inwardly sloping bottom surfaces 72 of the arrowhead shaped interlock, but not sufficiently to clamp the male die forming wedge 69.

FIG. 11B shows the immediately following condition in which the cutter 62 has moved laterally to sever the heat seal 70 against the anvil 63 and separate the package 34 from the above-lying tube 25. At the same time, male die part 57B carrying the wedge 69 partially retracts from the recess 68 of female die 58 and from between the teeth 71 of the dies 66, and the dies 66 pivot further inward driving the detent forming die teeth 71 toward one another to their maximum closed position, the teeth 71 pinching the packaging film 32 and thermoformable strip 31 therebetween to form the film and strip into the female die recess to continue forming the inwardly sloping bottom surfaces 72 of the arrowhead shaped reclosable seal 36, and forming the snap detents 73 best seen in FIGS. 11 and 13. The female die 58 is then moved somewhat left toward the dies 66 to set the arrowhead shape between itself and the facing surfaces of teeth 71 of detent forming dies 66. The detents 73 are formed because as the softened thermoformable material of the film and strip are compressed between the teeth 71 the only direction that the compressed material can move is laterally into the spaces between the teeth 71, and then bulge outward between the teeth, forming the detents 73.

FIG. 11C shows the male and female dies 57 and 58 outwardly retracted with the female die laterally carrying the package 34 held within it by the unopened detent forming dies 66, and the package end seal dies 60 and 61 and the cutter 62 have been retracted. The dies 66 remain engaged for a short time to complete setting of the detents, after which they open and release the completed package which drops to the conveyor 38 as shown in FIG. 1, and the sequence commencing with FIG. 11 is repeated. Sequencing and timing controls and drives for the sequential movements of the various dies is provided by standard commercially available components.

FIGS. 12 through 15 show in greater detail the detent forming toothed dies 66 and the structure of the reclosable seal 36. FIG. 12 shows more clearly the relationship between the dies and the reclosable seal, and shows the shorter die teeth 76 on one side of the die in the central region of the die corresponding to the region of the overlap longitudinal package seal 26 formed by the film margin 47, as best shown in FIG. 13, and also for a fin seal as shown in the earlier figures. The dies 66 are also formed at their opposite apposed ends with long flat teeth 80 which are slightly lower than the teeth 71 to accommodate the extra thickness of material in the gussets, the difference in elevation of the teeth 71 and 80 being on the order of thousandths of an inch. In some cases it has also been found desirable to slightly taper the teeth 80 downward from their beginning adjacent to the teeth 71 toward the die ends.

FIG. 13 also shows more clearly the snap detents 73 which are formed in the seal male part 36A and female part 36B by an outward bulging of the thermoformable material between adjacent teeth 71 of the dies 66 when the dies close. The heat softened material between the apposed die teeth is compressed and can only move laterally, but such movement causes the outward bulging of the material which forms the detents since material is moving from oppsite sides into the same space between the adjacent die teeth and can not move inward. This is also shown in FIG. 14 in which the detents 73 are shown behind the die teeth 71. FIG. 15 is a section taken through the detents and shows the interfitted arrangement.

FIG. 16 shows a completed gusseted package of the type shown in FIG. 6 about to be opened by cutting off the top heat seal 35 with scissors 77, and FIG. 17 shows the package of FIG. 16 with the top heat seal removed and pulled open, the bag remaining open because of the gussets and hinging folds 78 and 79. The hinge 78 results from the weakening produced by the strip 31 aperture 49 which is formed into the relatively rigid male part 36A of the reclosable seal 36, while the hinge 79 is formed at the abutment of the ends of the strip 31 located in the female part 36 B. The package is simply closed by inward directed finger pressure on the outside of the package along the male and female parts 36A and 36B of reclosable seal 36 which causes the package sides to infold the gussets and snap to each other so that the snap detents interlock. FIG. 18 is a showing similar to that of FIG. 17, but for a package of the type shown in FIG. 10, illustrating the pour spout configuration achieved with this form of package.

FIGS. 19 and 20 show the upper end of a package 34 in enlarged diagrammatic cross section to illustrate the opening of the package. As shown in FIG. 19, the top seal is removed by cutting below it to provide the free top tabs of packaging film 32 shown in FIG. 20. These top tabs are pulled away from each other as shown in FIG. 20 to open the female part 36B of the reclosable seal and disengage it from the inner male part 36A. The opening leverage is materially increased because the strip 31 is sealed to the film 32 by the trailing edge heat seal 40 and the opening pull is transmitted through the strip 31. Conversely, inadvertent opening of the package from the body side of the package is discriminated against because the strip 31 is substantially unsecured to the package film 32 at its leading edge 44 inside the package and there is no reinforcement of pull on the film by the strip.

Having now described the invention in connection with particularly illustrated embodiments thereof, it will be understood that modifications and variations of the invention may now occur from time to time to those normally skilled in the art without departing from the essential scope or spirit of the invention, and accordingly it is intended to claim the invention both broadly and specifically as indicated in the appended claims.

What is claimed is:

1. Packaging material for forming a sequence of flexible gusseted packages in which each of the packages to be formed is characterized by having front and rear faces and a pair of gusseted opposite sides extending between said front and rear faces, and having a re-closable interlocking seal effective to open and close one end of the package, comprising in combination,
   a) a continuous web of substantially constant thickness packaging material, said web having width and selectable running length, said width defining the side edges of said web, and
   b) a plurality of groups of discrete uni-planar strips of substantially constant thickness flexible material, the strips of each of said groups being disposed co-linearly transversely across said web with the strips ends being spaced endwise apart from each other, successive groups of strips being spaced lengthwise along said web at package length intervals, each of said strips having length and width, said strips width defining the strips ends, said strips lengths having top and bottom edges and being greater than said strips widths, said lengths of each of said plurality of strips being secured transversely to the running length of said web of packaging material along the strips top edges and being substantially unsecured along the bottom edges.

2. Packaging material for forming a flexible gusseted package as set forth in claim 1 wherein each of said plurality of strips is secured to said packaging material for a short length substantially centrally along its bottom edges.

3. Packaging material for forming a flexible gusseted package as set forth in claim 1 wherein each of said plurality of strips is secured to said packaging material substantially continuously along its top edge.

4. Packaging material for forming a flexible gusseted package as set forth in claim 1 wherein each of said plurality of strips is secured to said packaging material substantially continuously along its top edge and opposite ends.

5. Packaging material for forming a flexible gusseted package as set forth in claim 1 wherein each of said plurality of strips is secured to said packaging material substantially continuously along its top edge and opposite ends and for a short length substantially centrally along its bottom edge.

6. Packaging material for forming a flexible package having a reclosable interlocking seal as set forth in claim 1, wherein both side edges of said web are disposed at a distance beyond the outer ends of said plurality of discrete collinear strips sufficient to provide side margins of web material for the formation of a package fin seal.

7. Packaging material for forming a flexible package having a reclosable interlocking seal as set forth in claim 1 wherein said packaging material and said strips are both single thickness mono-layer materials.

8. Packaging material for forming a flexible package having a reclosable interlocking seal as set forth in claim 1 wherein said packaging material is a single thickness multi-layer material.

9. Packaging material for forming a flexible package having a reclosable interlocking seal as set forth in claim 1 wherein said strips are a single thickness multi-layer material.

10. Packaging material for forming a flexible package having a reclosable interlocking seal as set forth in claim 1 wherein said packaging material and said strips are both single thickness multi-layer materials.

* * * * *